(12) United States Patent
Shah

(10) Patent No.: US 8,706,161 B2
(45) Date of Patent: *Apr. 22, 2014

(54) METHOD AND APPARATUS FOR DISABLING THE RF FUNCTIONALITY OF A MULTI-FUNCTION WIRELESS COMMUNICATION DEVICE WHILE MAINTAINING ACCESS TO LOCAL FUNCTIONALITY

(75) Inventor: Nitin J. Shah, Cupertino, CA (US)

(73) Assignee: Durham Logistics, LLC, Las Vegas, NV (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/453,992

(22) Filed: Apr. 23, 2012

(65) Prior Publication Data

US 2012/0208508 A1  Aug. 16, 2012

Related U.S. Application Data

(63) Continuation of application No. 13/209,813, filed on Aug. 15, 2011, now Pat. No. 8,175,642, which is a continuation of application No. 12/571,372, filed on Sep. 30, 2009, now Pat. No. 8,019,384, which is a continuation of application No. 11/496,021, filed on Jul. 28, 2006, now Pat. No. 7,647,070, which is a continuation of application No. 09/745,493, filed on Dec. 22, 2000, now Pat. No. 7,356,351.

(51) Int. Cl.
*H04M 1/00* (2006.01)

(52) U.S. Cl.
USPC ............ 455/556.1; 455/556.2; 455/557; 455/574

(58) Field of Classification Search
USPC ........ 455/455, 556.1, 556.2, 557, 574, 343.1, 455/343.5, 418, 419
See application file for complete search history.

(56) References Cited

U.S. PATENT DOCUMENTS

| | | | |
|---|---|---|---|
| 4,035,779 A * | 7/1977 | Birney et al. | ................. 711/164 |
| 4,972,457 A | 11/1990 | O'Sullivan | |
| 5,193,212 A | 3/1993 | Son | |
| 5,337,346 A | 8/1994 | Uchikura | |
| 5,420,599 A | 5/1995 | Erkocevic | |
| 5,513,212 A | 4/1996 | Bremer | |
| 5,519,386 A | 5/1996 | Tobergte | |
| 5,519,763 A | 5/1996 | Namekawa et al. | |

(Continued)

FOREIGN PATENT DOCUMENTS

| | | |
|---|---|---|
| EP | 1182901 | 2/2002 |
| JP | 11017829 | 1/1999 |

OTHER PUBLICATIONS

Stolowitz Ford Cowger LLP; Related Case Listing; Apr. 23, 2012; 1 Page.

*Primary Examiner* — Minh D Dao
(74) *Attorney, Agent, or Firm* — Stolowitz Ford Cowger LLP

(57) ABSTRACT

A method and apparatus for disabling the communication functionality (i.e., disabling the transmission and/or reception of RF signals) of an integrated device, while still providing access to the local functionality of such device. A control and select function, such as a switch that is implemented by hardware or software or a combination thereof, is provided in an integrated device to allow the end user of the device to access the local data processing functionality of the device, even while the wireless communication functionality of such device is disabled.

30 Claims, 1 Drawing Sheet

(56) References Cited

U.S. PATENT DOCUMENTS

| | | |
|---|---|---|
| 5,584,054 A | 12/1996 | Tyneski |
| 5,752,199 A | 5/1998 | Scott |
| 5,894,595 A | 4/1999 | Foladare et al. |
| 5,956,651 A | 9/1999 | Wilkie et al. |
| 5,964,319 A | 10/1999 | Weingarden |
| 5,983,073 A | 11/1999 | Ditzik |
| 6,038,294 A | 3/2000 | Tran et al. |
| 6,061,553 A | 5/2000 | Matsuoka et al. |
| 6,085,096 A | 7/2000 | Nakamura |
| 6,088,576 A | 7/2000 | Sone |
| 6,173,352 B1 | 1/2001 | Moon |
| 6,233,464 B1 * | 5/2001 | Chmaytelli ................ 455/556.2 |
| 6,343,213 B1 * | 1/2002 | Steer et al. .................... 455/411 |
| 6,397,082 B1 | 5/2002 | Searle |
| 6,434,371 B1 | 8/2002 | Claxton |
| 6,453,182 B1 | 9/2002 | Sprigg |
| 6,490,455 B1 | 12/2002 | Park et al. |
| 6,512,917 B1 | 1/2003 | Hiramatsu |
| 6,549,767 B1 | 4/2003 | Kawashima |
| 6,556,845 B1 | 4/2003 | Ide et al. |
| 6,625,478 B1 | 9/2003 | Nonogaki |
| 6,633,769 B2 | 10/2003 | Shoobridge |
| 6,643,517 B1 | 11/2003 | Steer |
| 6,643,527 B2 | 11/2003 | Satoh |
| 6,832,093 B1 | 12/2004 | Ranta |
| 6,928,300 B1 * | 8/2005 | Skinner et al. ............. 455/556.2 |
| 7,039,425 B1 | 5/2006 | Mazawa et al. |
| 7,061,365 B2 | 6/2006 | Izumi |
| 7,181,229 B2 * | 2/2007 | Singh et al. ................ 455/456.4 |
| 7,260,390 B1 | 8/2007 | Skinner |
| 7,272,025 B2 * | 9/2007 | Hawley .......................... 363/49 |
| 7,289,832 B1 | 10/2007 | Enoki et al. |
| 7,356,351 B1 * | 4/2008 | Shah .......................... 455/556.1 |
| 7,647,070 B2 | 1/2010 | Shah |
| 8,019,384 B2 | 9/2011 | Shah |
| 2002/0123372 A1 | 9/2002 | Kobayakawa |
| 2003/0129996 A1 | 7/2003 | Maloney et al. |
| 2004/0087318 A1 | 5/2004 | Lipovski |
| 2004/0198306 A1 * | 10/2004 | Singh et al. ................... 455/345 |
| 2006/0158909 A1 * | 7/2006 | Hawley ...................... 363/21.12 |
| 2006/0186994 A1 * | 8/2006 | Lin et al. ...................... 340/5.74 |

\* cited by examiner

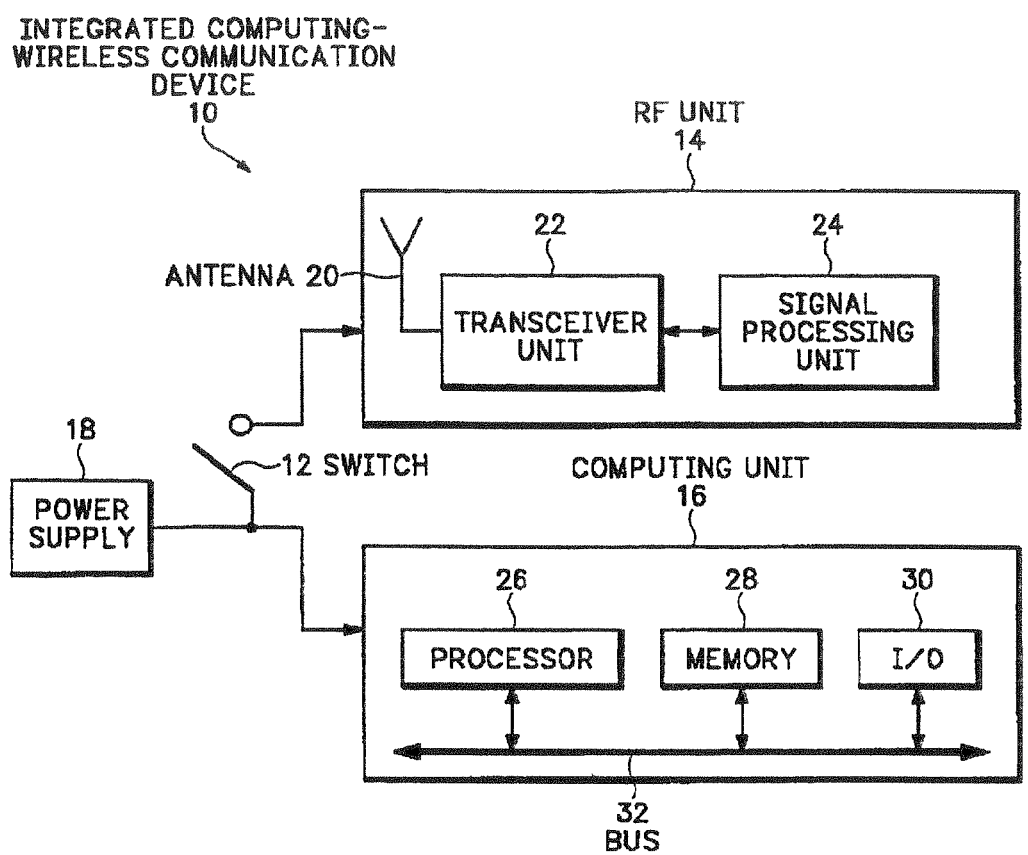

METHOD AND APPARATUS FOR DISABLING THE RF FUNCTIONALITY OF A MULTI-FUNCTION WIRELESS COMMUNICATION DEVICE WHILE MAINTAINING ACCESS TO LOCAL FUNCTIONALITY

RELATED APPLICATIONS

This application is a continuation of and claims priority to U.S. application Ser. No. 13/209,813, filed Aug. 15, 2011, now issued as U.S. Pat. No. 8,175,642, which is a continuation of and claims priority to U.S. application Ser. No. 12/571,372, filed Sep. 30, 2009, now issued as U.S. Pat. No. 8,019,384, which is a continuation of and claims priority to U.S. patent application Ser. No. 11/496,021, filed Jul. 28, 2006, now issued as U.S. Pat. No. 7,647,070, which is a continuation of and claims priority to U.S. patent application Ser. No. 09/745,493, filed Dec. 22, 2000, now issued as U.S. Pat. No. 7,356,351, all of which we incorporate by reference.

FIELD OF THE INVENTION

The present invention relates to the field of wireless communications systems, and in particular, to a method and system for disabling the radio functionality of a multifunction communication device, while continuing to provide access to the local, non-radio functionality (e.g., information access and/or manipulation functionality) of such device.

BACKGROUND OF THE INVENTION

The utilization and functionality of end user portable devices is increasingly growing more diverse than the traditional automobile-mounted or even portable cellular telephone, which was exclusively a communications tool, and thus had virtually no practical functionality without the radio link in operation. In contrast to such early cellular telephones, which provided little more than wireless/RF communications functionality, modern systems increasingly integrate communication functionality with other types of non-communication or "local" functionality in one integrated device. On the other hand, portable appliances, such as laptop computers, personal digital assistants (PDAs), and even gaming devices, that traditionally provided only "local functionality" have evolved into multi-function devices that provide hard-wired or even wireless communication functionality, as well as "local computing functionality." In sum, traditional portable data storage/manipulation devices and traditional wireless communication devices have evolved and merged into multi-function integrated portable devices that provide both communication functionality and local functionality.

As used herein, an "integrated" or "multifunction" communication device or simply "integrated device" includes devices that integrate both wireless communication functionality as well as non-communication functionality (e.g., a cellular device that incorporates data processing/computing functionality) into one device, as well as two separate devices that are interfaced to provide both communications and local functionality (e.g., a laptop computer or PDA or other portable device that is interfaced with another device, such as a wireless modem or other wireless communication module or PC card, such as a PCMCIA card, to provide both information access and/or manipulation functionality as well as communication functionality). The term "local functionality" is used herein to denote non-communication functionality, such as information access or manipulation (e.g., gaming, address storage/retrieval, execution of one or more applications such as word processing, spreadsheet, etc.). In other words, "local functionality" is used herein to denote various functionality of an integrated device that may be enjoyed by an end user while the device is not transmitting and/or receiving RF signals.

Because modern integrated devices, such as multi-function cellular phones or portable data processing devices that also provide wireless communication functionality, are not limited exclusively to communications functionality, but may include local functionality, such devices may provide significant utility even when not "connected" to (i.e., receiving signals from, or transmitting signals to) an external entity through a wireless communication channel.

Unfortunately, modern integrated devices have suffered from a number of limitations. For instance, when an integrated cellular telephone is in an "idle" state (i.e., the power is on, and the integrated device may receive calls, transmit and/or receive control signals sent by or to nearby base stations, respectively, or otherwise be enabled to transmit/receive RF signals), a received call may cause a disruption to the end user in certain situations, such as when the end user is in a meeting, in a classroom, etc. Even if a traditional voice or data "call" is not received, other information exchange, such as periodic updates, including voicemail notifications, control/broadcast information exchange with an external entity (e.g., a base station), etc., may cause disruption or other undesirable effects in certain situations. In order to prevent such disruption, the end user may forgo the use of the integrated device altogether, thereby not being able to access the local functionality of the device. Moreover, because power conservation is a significant issue concerning mobile/portable integrated devices, which generally use rechargeable batteries that provide limited use time, the idle state of the integrated device may unnecessarily consume power, especially when the end user of such a device intends to access exclusively the local functionality of the device. Finally, the use of such integrated devices is typically altogether precluded in certain restricted areas (e.g. aboard aircraft), where the electromagnetic radiation caused by the RF portions of such devices, which may periodically transmit control or other types of signals and/or receive the same, may interfere with navigational or safety equipment.

As such, even though modem integrated devices potentially provide both communications functionality and local functionality, such local functionality in many circumstances may not be available because of the undesirable effects caused by the communications functionality, such as disruption, unnecessary consumption of power, interference with safety or navigational equipment in restricted areas, etc.

Thus, what is needed is a method and apparatus for increasing access to the local functionality of integrated devices.

SUMMARY OF THE INVENTION

A method and apparatus is provided for disabling the communication functionality (i.e., disabling ability of the device to transmit and/or receive RF signals) of an integrated device, while still providing access to the local functionality of such device. A control and select function, such as a switch that is implemented by hardware or software or a combination thereof, is provided in an integrated device to allow the end user of the device to access the local data processing functionality of the device, even while the wireless communication functionality of such device is disabled.

BRIEF DESCRIPTION OF THE DRAWINGS

FIG. 1 is a block diagram of an integrated computing-wireless communication device in accordance with one embodiment of the invention.

DETAILED DESCRIPTION

The present invention provides method and apparatus is provided for disabling the communication functionality of an integrated device (i.e., disabling the ability of the device to transmit and/or receive RF signals), while still providing access to the local functionality of such device. In one embodiment, a control and select function, such as a switch or other toggle or selecting mechanism, which mechanism may be implemented by hardware or software or a combination thereof, is provided in an integrated computing-wireless device, to allow an end user of the device to disable transmission and/or reception of signals associated with the radio communication portion of the device, while being able to access the local functionality of the device. Such local functionality may include, but is not limited to, access to one or more data storage areas for entry or retrieval of data (e.g., addresses, phone numbers, or other information), utilization of software applications (e.g., word processing, scheduling, spreadsheet, calculator, etc.), games, multimedia (e.g., playing video and/or audio, etc.), and/or other local data processing features and functions that can be performed even during such time that the device does not receive signals from, or transmit signals to, an external entity. The external entity may include a cellular base station or other wireless communication device that can enable transfer of voice and/or data between the integrated device and the external device and/or a network, such as the Internet, public switched telephone network (PSTN), etc.

In the following description, numerous specific details are set forth to provide a thorough understanding of the invention and its various embodiments. However, it should be appreciated that the invention may be practiced without these specific details. In other instances, well-known circuits, structures, and techniques have not been shown in detail in order to avoid obscuring the invention. It should further be noted that the various elements of the invention may be implemented in hardware (e.g., circuitry), software (e.g., machine-executable instructions), or a combination thereof.

FIG. 1 is a block diagram of an integrated communication device, in accordance with one embodiment of the invention. In one embodiment, the integrated device 10 shown in FIG. 1 represents a multi-function cellular telephone that provides wireless voice and/or data communication functionality, as well as local functionality, such as information access and/or manipulation. In an alternative embodiment, the device 10 represents a portable data processing device (e.g., a personal digital assistant (PDA), a laptop computer, a gaming device, or other portable device that enables information access and/or manipulation or other local functionality) that may also provide wireless communication functionality. In such an embodiment, the portable computing device may include integrated or modular radio/wireless communication functionality. In the latter case, the device 10 may include, for example, an installable-removable PCMCIA card/modem or other installable module that provides voice and/or data wireless and/or wired modem functionality. In yet other embodiments, the integrated device 10 may represent one or more types of devices, including "portable multifunction appliance(s)," that provide both local functionality and wireless communication functionality.

As shown in FIG. 1, the integrated device 10 includes a power supply 18 to provide power to a computing unit 16 exclusively, or selectively, as provided by a switch 12 coupled to the power supply 18 and the computing unit 16, to provide power both to the computing unit 16 as well as a radio communication or RF unit 14. The power supply, in one embodiment, includes a direct current (DC) output rechargeable battery. In alternative embodiments, the power supply may instead, or in addition, include disposable battery power, AC outlet power, etc.

The RF unit 14 includes hardware, software, or combination thereof to enable wireless communication between the device 10 and an external entity, which may be a cellular base station or other transceiving device coupled to a voice network (e.g., the public switched telephone system (PSTN) or other voice network) and/or a data network (e.g., a WAN, such as the Internet, an intranet/LAN) or a combination voice/data network, for enabling the integrated device 10 to send and/or receive voice and/or data. To aid in the understanding of the invention, the RF unit 14 is shown to include an antenna 10, a transceiver unit 22, and a signal processing unit 24. It should be appreciated, however, that the RF unit 14 may generally include various other circuitry and/or software modules, such as one or more modulators, demodulators, analog-to-digital circuits (ADCs), digital-to-analog circuits (DACs), filters, etc. Also, the tranceiving unit 22, for example, may represent one or combination of a receiver, a transmitter, a receive (Rx)/transmit(Tx) switch, etc. The transmitter portion of the tranceiving unit 22 may include a local oscillator, for example, and in general, the tranceiving unit 22 may include various known RF components and/or software modules to allow wireless reception and transmission of information embodied in an electromagnetic radiation.

The computing unit 16 provides the local functionality of the device 10. The computing unit 16 is shown to include a processor 26, a memory 28, and an input/output (I/O) unit 30, all coupled to a bus 32. The processor 26 includes at least one processor to provide data processing functionality to the device 10. Such functionality may be exclusively local functionality, or may involve communication between the device 10 and an external device (e.g., Web browsing, sending/receiving email, files, multimedia, voice, etc.). Thus, the computing unit 16 may function exclusive of the RF unit 14, or in conjunction therewith. The external device may be another integrated device, a base station that employs an adaptive antenna array (or "smart antenna system), a conventional antenna system base station, etc. In turn, such external device may be coupled to a voice and/or data network (e.g., the PSTN, Internet, an intranet, etc.) to facilitate the exchange of voice and/or date between the integrated device 10 and the network. The memory 28 represents one or more storage devices/media for storing information, including data and/or machine-executable instructions. As such, the memory 28 may include one or a combination of random access memory (RAM), read-only memory (ROM), flash memory, hard disk, floppy disk optical storage, such as CDROM, DVD, etc.

The I/O unit represents one or more user input and output interfaces and devices, and in one embodiment, includes a user-viewable screen, such as a liquid crystal display (LCD), as well as other I/O components, such as an alpha-numeric keypad and/or a touch screen, a joystick, a pointing device, a speaker, a microphone, etc.

In one embodiment of the invention, the switch 12 is coupled to the power supply 18 and the computing unit 16, and may be toggled to couple the power supply 18 to the RF unit 14 to selectively deliver or disable the delivery of power from the power supply 18 to the RF unit 14. In one embodiment of the invention, the switch 12 provides two modes of "on-power operation" for the integrated device 10. A first mode of operation is provided in which both the radio communication unit 14 is enabled (i.e., the RF unit 14 may receive signals from and/or transmit signals to an external entity) and the computing unit 16 is enabled to provide local functionality. In the first mode of operation, the integrated device 10 may provide communication functionality and/or radio functionality. For example, the integrated device 10, in the first mode, may provide network functionality, such as Web browsing, sending/receiving email, streaming audio/video, voice-over-IP, video conferencing, or other functions that involve wireless voice and/or data communication between the device 10 and an external device. In one embodiment, the device 10 may, in addition to providing wireless communication functionality, also provide wired communication functionality, for example, by providing a hard-wired Ethernet or public switched telephone network (PSTN) interface.

In addition, and in accordance with one embodiment of the invention, the switch 12 provides a second mode of operation in which the radio communication unit 14 is disabled, such that the radio communication unit 14 does not receive power from the power supply 18, and thus, the RF unit 14 may not receive or transmit signals. In the second or "radio mute" mode of operation, the computing unit 16 may still receive power, and thus provide access to the local functionality of the integrated device 10. This second mode may provide increased accessibility to local functionality relative to prior art integrated devices.

It should be appreciated that the switch 12 may be implemented in hardware or software or a combination thereof. For example, in one embodiment, a user-viewable screen of the device 10 may include a "soft-key" that may be selected by a user to disable the radio communication unit 14. For example, a selectable icon may appear on the screen of the device 10, which icon, when selected, disables the RF unit 14. In one embodiment, the RF unit 14 is disabled by switching off the power supply to the transmitter and receiver portions of the radio communication unit 14. In addition to or in lieu of the "soft-key," mechanism, one embodiment of the invention includes a depressable mechanical or touch-sensitive button or display icon that a user may toggle to disable the radio communication 14 (e.g., by terminating or switching off power delivery to the radio communication unit 14).

In yet another embodiment, the switch 12 may be implemented, or controllable, at least in part by an external device. In this embodiment, an external device, such as a base station or other device that is coupled to a voice and/or data network may trigger the device 10 to operate in the first or second mode. For example, the end user of the device 10 may program a system coupled to the network to cause the device 10 to operate in the first or second mode at a predetermined time (e.g., when the end user expects to board an aircraft, or go to a meeting, or any other time defined by the end user or other programmer). Furthermore, in one embodiment, the switch is implemented at least in part in a certain areas of a network, such as in a geographic area that includes at least a portion of a restricted area, such as an airport. In this embodiment, a broadcast signal is transmitted in such areas of the network to one or integrated devices, such as the device 10, to cause each such device to operate in the second (or first) mode. Therefore, it should be appreciated that the switch 12 may be implemented in a number of ways that may include one or combination or hardware and software, and furthermore, that the switch may be implemented or controllable at least in part on one or more devices external to the integrated device 10.

Furthermore, it should be appreciated that while one embodiment is shown that includes a single power supply, alternative embodiments may include separate power supplies for each of the RF unit 14 and the computing unit 16, along with a switching mechanism to disable the former power supply. In alternative embodiments, the RF unit 14 may be disabled by disabling just one (or possibly more) portions of the RF unit to disable RF signal transmission or reception by the device 10 that may be disruptive or which may cause interference in restricted areas, such as aircraft. For instance, in one alternative embodiment, the local oscillator of the RF unit may be disabled by software or a switch implemented by hardware. In another embodiment, the antenna 20 may be decoupled from the transceiver unit 22 by a switch. In yet another embodiment, the communication functionality may be disabled by increasing the electromagnetic shielding of the device 10 (e.g., by having an antenna that may be retracted into a shielded area, such as provided by an electromagnetic coil.), such that the wireless communication functionality of the device is effectively disabled. Still, the embodiments described may be modified by those having skill in the art to provide a selective mechanism for disabling the wireless communication functionality of an integrated device, while maintaining access to local functionality.

In one embodiment of the invention, the I/O unit 30 also includes an indicator to indicate whether the device 10 is operating in the second mode (and/or first mode). For example, in one embodiment, an LED and/or icon on the display of the device 10 may provide such indication. In addition or in lieu of a visual indication, the device 10 may also include an audible indicator to signal whether the device 10 is operating in the first or second mode of operation. In one embodiment, when the second mode of operation is selected, the device 10 transmits a notification to an external device just prior to operating in the second mode (i.e., prior to disabling the radio communication functionality) that the device 10 is entering the "radio mute" mode. As such, the external device may perform certain functionality in accordance with such notification (e.g., allocate additional bandwidth to other devices, track and/or store incoming data or voice requests intended for the device 10, such as voicemails, incoming data or voice calls, etc.).

It should be appreciated that in alternative embodiments, one or more circuits or devices may be shared between the RF unit 14 and the computing unit 16. For example, a processor may provide signal processing functionality to the RF unit 14, while also providing local functionality (e.g., execution of applications, storage/retrieving of data, etc.) associated with the computing unit 16. For instance, the processor 26 may include one or more general-purpose processors to provide signal processing and data processing functionality to the RF unit 14 and the computing unit 16, respectively. As such, the switch 12 may merely disable (at least a portion of) the transceiver unit 22 and/or the antenna 20, such that the device 10 may still provide local functionality while communication functionality is disabled (i.e., RF signals are not being transmitted and/or received by the device 10).

Although the invention has been described with reference to several embodiments that provide increased access to the local functionality of integrated computing-wireless devices, it will be appreciated that various alterations and modifications may be possible without departing from the spirit and scope of the invention, which is best understood by the claims that follow.

The invention claimed is:

1. A method performed by a mobile communication device, the method comprising:
   transmitting a voice communication, by the mobile communication device, over a wireless communication link;
   providing, by the mobile communication device, a first mode allowing wireless communication and allowing local function of the mobile communication device;
   providing, by the mobile communication device, a second mode disabling the wireless communication and maintaining the local function of the mobile communication device; and
   transmitting, by the mobile communication device over the wireless communication link, a notification message to another device in response to receiving user input, the notification message notifying the another device that the mobile communication device is switching from the first mode to the second mode.

2. The method of claim 1, wherein the another device is configured to allocate additional wireless resources to other communication devices or to store incoming voicemails intended for the mobile communication device during the second mode.

3. The method of claim 1, further comprising:
   disabling, by the mobile communication device, at least a portion of a radio communication functionality in the second mode in response to switching from the first mode to the second mode.

4. The method of claim 1, wherein the another device is at least one base station.

5. The method of claim 1, wherein the second mode is airplane mode.

6. The method of claim 1, further comprising:
   switching from the first mode to the second mode in response to receiving a control signal from the another device.

7. The method of claim 1, further comprising:
   switching from the second mode to the first mode in response to receiving a control signal from the another device.

8. The method of claim 1, wherein the local function comprises operating of productivity software, contact information software, or a game.

9. A mobile device, comprising:
   a communication unit configured to communicate with a base station;
   a touch screen display configured to display a soft key used to switch from a first mode to a second mode; and
   at least one processor configured to:
      utilize the communication unit to communicate with the base station in the first mode;
      utilize software for the mobile device with at least part of the communication unit disabled in the second mode; and
      notify the base station that the mobile device will operate in the second mode.

10. The mobile device of claim 9, wherein the at least one processor is further configured to notify the base station in response to receiving a control signal from the base station to switch to the second mode.

11. The mobile device of claim 10, wherein the at least one processor is further configured to receive the control signal from the base station at a predetermined time or in a particular geographic location.

12. The mobile device of claim 9, wherein the software comprises productivity software, contact information software, or a game.

13. The mobile device of claim 9, wherein the base station is configured to allocate additional wireless resources to other mobile devices in response to the notification to the base station that the mobile device will operate in the second mode.

14. The mobile device of claim 9, wherein a network associated with the mobile device is configured to store incoming voicemails for the mobile device during the second mode.

15. The mobile device of claim 9, wherein the communication unit comprises a transceiver.

16. The mobile device of claim 9, wherein the second mode is airplane mode.

17. The mobile device of claim 9, wherein the at least one processor is further configured to switch from the second mode to the first mode in response to reception of a control signal from the base station.

18. A device, comprising:
   circuitry configured to provide a first mode, wherein the first mode allows wireless communication function and allows local function of the device;
   circuitry configured to provide a second mode, wherein the second mode disables the wireless communication function and maintains the local function of the device;
   circuitry configured to transmit a notification message to another device over a wireless communication link in response to user input; and
   circuitry configured to switch the device from the first mode to the second mode in response to transmission of the notification message; and
   wherein the notification message is configured to indicate that the device is switching into the second mode.

19. The device of claim 18, wherein the another device is configured to allocate additional wireless resources to other devices during the second mode or the another device is configured to store incoming voicemails intended for the device during the second mode.

20. The device of claim 18, wherein the circuitry configured to switch from the first mode to the second mode is further configured to disable at least a portion of a radio communication function in the second mode.

21. The device of claim 18, wherein the second mode is airplane mode.

22. The device of claim 18, wherein the circuitry configured to transmit the notification message is further configured to operate in response to reception of a control signal from the another device to switch the device to the second mode.

23. The device of claim 18, wherein the circuitry configured to switch from the first mode to the second mode is further configured to switch the device from the second mode to the first mode in response to reception of a control signal from the another device.

24. The device of claim 18, wherein the local function comprises operation of productivity software, contact information software, or a game.

25. A method performed by a mobile device, the method comprising:
   communicating data from the mobile device to a base station in a first mode;
   operating software stored locally in a memory device of the mobile device and disabling, at least in part, communication of the data to the base station in a second mode; and
   displaying, on a touch screen display, a soft key configured to indicate a switch from the first mode to the second mode;
   in response to selection of the soft key:
      switching the mobile computing device to the second mode; and transmitting a notification to the base station that the mobile device will operate in the second mode.

26. The method of claim 25, wherein transmitting the notification to the base station occurs in response to receiving a control signal from the base station to switch the mobile device to the second mode.

27. The method of claim 26, further comprising
receiving the control signal from the base station at a predetermined time or receiving the control signal in a particular geographic location.

28. The method of claim 25, wherein a network associated with the mobile device stores incoming voicemails intended for the mobile device during the second mode.

29. The method of claim 25, wherein the second mode is airplane mode.

30. The method of claim 25, further comprising:
switching from the second mode to the first mode in response to receiving a control signal from the base station.

* * * * *